United States Patent [19]

Sills et al.

[11] Patent Number: 4,564,220
[45] Date of Patent: Jan. 14, 1986

[54] ELASTIC GASKET PIPE COUPLING FOR PRESSURIZED PLUMBING SYSTEMS

[75] Inventors: Andy B. Sills; Cecil M. Sills, both of Newport Beach, Calif.

[73] Assignee: Anaheim Foundry Company, Anaheim, Calif.

[21] Appl. No.: 600,996

[22] Filed: Apr. 16, 1984

[51] Int. Cl.⁴ .............................................. F16L 21/00
[52] U.S. Cl. .................................... 285/236; 285/383
[58] Field of Search ............... 285/236, 373, 419, 242, 285/243, 252, 253, 235, 383

[56] References Cited

U.S. PATENT DOCUMENTS

| 3,233,922 | 2/1966 | Evans | 285/236 |
| 3,359,017 | 12/1967 | Schaub | 285/236 |
| 3,837,683 | 9/1977 | Taylor | 285/236 |
| 4,036,513 | 7/1977 | Loftus et al. | 285/236 X |
| 4,101,151 | 7/1970 | Ferguson | 285/322 |
| 4,312,525 | 1/1982 | Kleykamp | 285/236 |

FOREIGN PATENT DOCUMENTS 981723 1/1976 Canada .............................. 285/236

Primary Examiner—Dave W. Arola
Attorney, Agent, or Firm—Richard H. Zaitlen

[57] ABSTRACT

An improved elastic gasket-type pipe coupling device for providing a leak-proof joint between two adjacent pipe segments in a pressurized plumbing system. According to the preferred embodiment of the invention, the pipe coupling includes a cylindrical elastic gasket, a metallic compression band circumferentially disposed about the elastic gasket, and a plurality of tensioning bands attached to and encircling the compression band. The cylindrical elastic gasket includes an inwardly extending, centrally disposed separation ring and at least two integral, inwardly extending sealing rings symmetrically disposed on opposing sides of the separation ring. An enhanced pressure-resistant seal is achieved by locating the tensioning bands at points immediately adjacent to and on both sides of each sealing ring.

4 Claims, 3 Drawing Figures

1

ELASTIC GASKET PIPE COUPLING FOR PRESSURIZED PLUMBING SYSTEMS

BACKGROUND OF THE INVENTION

1. Field of the Invention

The present invention relates to pipe couplings and more particularly concerns new and useful improvements in elastic gasket-type pipe couplings designed for use in connecting sections of pipe of the type typically employed in commercial and domestic sewage, sanitation, and similar plumbing systems operating with or without internal pressure.

2. Description of the Prior Art

Commercial and domestic plumbing systems, such as those used for sewage, sanitation, and the like, generally employ sections of pipe joined together in end-to-end relationship with some form of leak-proof coupling. Often these pipe sections are made from inexpensive cast iron with wide external pipe diameter tolerances and irregular surface features.

Several different pipe coupling assemblies have been proposed for joining pipe segments in end-to-end relationship. One convenient and successful coupling assembly is that described in U.S. Pat. No. 3,233,922 wherein a cylindrical elastic gasket is positioned around abutting pipe ends with a flexible corrugated metallic compression band wrapped around the elastic gasket and two or more hose clamps in turn positioned around the outside of the metallic compression band to secure the coupling assembly to the pipe ends. This elastic gasket-type pipe coupling, however, does not provide a leak-proof seal in many pressurized plumbing systems. Sewage lines within a high-rise commercial building, for example, will develop sufficient pressure over the space of a few stories to induce leakage of prior art elastic gasket-type couplings in vertically-oriented pipe structures.

In turn, none of the prior art devices employed in coupling pipe segments within a pressurized plumbing system enjoy the ease of installation and widespread utility of the elastic gasket-type pipe coupling. Threaded joints, the most common type of pressurized pipe coupling, require relatively thick pipe walls from which to form pipe threads, and further require special sealing compounds to provide a leak-proof seal. Thicker walled pipes, however, raise the cost of plumbing systems, and complicate the problem of securing the plumbing system within a building structure. Welded joints are also commonly employed as pressurized plumbing system pipe couplings. Welded joints, however, cannot be dismantled, require welding expertise on the part of the plumbing system installer, and create a fire hazard during installation and repair. This last consideration is a particular disadvantage in plumbing systems intended for use with flammable fluids or gases.

Previous attempts to modify elastic gasket-type pipe couplings for use in pressurized plumbing systems have met with limited sucess. One approach, illustrated in U.S. Pat. No. 3,359,017, focused on a means of applying greater compression forces to the corrugated metallic compression band and underlying gasket of an elastic gasket-type pipe coupling. Corrugations on a trailing edge of the metallic compression band were tapered off so as to terminate in a smooth planar surface. This structure avoided an interlocking of corrugations between overlapping portions of the metallic compression band which had previously hindered compression of the underlying elastic gasket. The greater compression forces more firmly sealed the elastic gasket to the outer surfaces of the abutting pipe ends. Due to surface irregularities common to the outer surfaces of castiron pipes, and the inexact placement of hose clamps compressing the coupling assembly, however, this approach provided a leak-proof coupling only in lightly pressurized plumbing systems.

Another approach, disclosed in U.S. Pat. No. 4,101,151, replaced the corrugated metallic compression band of the prior art with a slotted compression band having a raised central portion and flanged edges. This pipe coupling, however, could be used only in conjunction with pipe segments having an annular outwardly projecting hub on the outer suface of each pipe end, thus precluding the use of this pipe coupling with the more commonly available hubless cast iron pipe segments. This hub requirement further precluded use of the '151 pipe coupling in conjunction with "cut-to-fit" plumbing system assembly techniques.

Still another effort, disclosed in U.S. Pat. No. 3,581,901, required the use of pipe segments having an annular groove cut into the outer surface of each pipe end. This annular groove requirement, however, gives rise to the same limitations in application as encountered with the '151 pipe coupling.

SUMMARY OF THE INVENTION

In accordance with the present invention, there is provided a pipe coupling device creating a leak-proof connection between two adjacent pipe segments which represents a still further advancement in the state of the art of joining pipe segments. The pipe coupling device of the present invention provides all the advantages inherent in an elastic gasket-type pipe coupling while still forming a leak-proof seal in a pressurized plumbing system. Thus a leak-proof pressure-resistant seal may be formed from standard, commercially available, cast iron or plastic-type pipe segments, which need not be hubbed, grooved, or threaded in any manner. The pipe coupling of the present invention will form a pressure-resistant seal between two pipe segments of slightly varying outer diameters and irregularities in the outer surfaces of pipe segments will not deteriorate the quality of the seal. Further, elaborate procedures are not required to dismantle the pipe coupling and remove pipe segments from the plumbing system as maintenance may require.

According to the preferred embodiment, the pipe coupling of the present invention comprises a cylindrical elastic gasket having a separation ring centrally disposed within the gasket and two or more pairs of inwardly disposed sealing rings symmetrically arranged about the inner separation ring. A metallic compression band having longitudially-oriented corrugations is wrapped about the elastic gasket such that the ends of the metallic compression band overlap. A purality of tensioning bands encircle the metallic compression band to apply compression forces which secure the pipe segments and seal the coupling. These tensioning bands are of a sufficent number and so arranged about the metallic compression band and elastic gasket as to reside on either side of each sealing ring. Direct compressional loading of the elastic gasket on either side of each sealing ring, rather than by directly compressing each sealing ring, as provided in the prior art, creates a leak-proof pipe coupling at pressures substantially greater than that achieved by any of the elastic gasket-type pipe couplings of the prior art.

OBJECTS

It is therefore an object of the present invention to provide an improved elastic gasket-type pipe coupling.

It is a further object of the present invention to provide a pipe coupling which will form a fluid-tight joint between two pipe segments in end-to-end relationship in a pressurized plumbing system.

It is a still further object of the present invention to provide a pipe coupling between pipe segments having varied outer diameters and irregular outer surfaces.

It is another object of the present invention to provide a pipe coupling which is easy to use and does not require any modification of standard, commercially available, cast-iron or plastic pipe segments.

Still other objects, features, and attendant advantages of the present invention will become apparent to those skilled in the art from reading the following detailed description of the preferred embodiment, taken in conjunction with the accompanying drawings wherein like numerals designate like parts in the several figures and wherein:

DESCRIPTION OF THE PREFERRED EMBODIMENT

Figure 1:
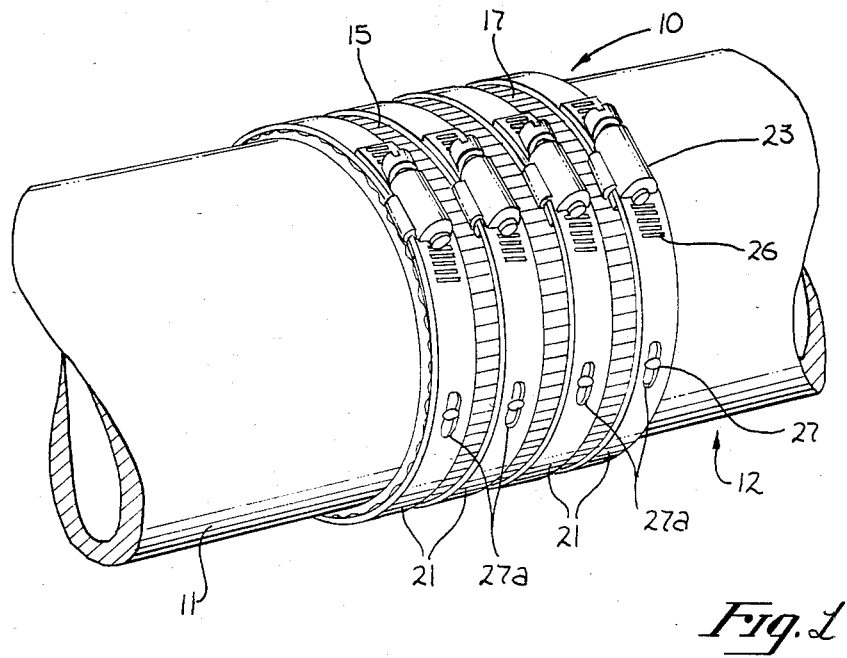
FIG. 1 is a perspective view of a preferred embodiment of the present pipe coupling shown in operative position, providing a leak-proof coupling between two abutting pipe segments in a plumbing system.
Figure 2:
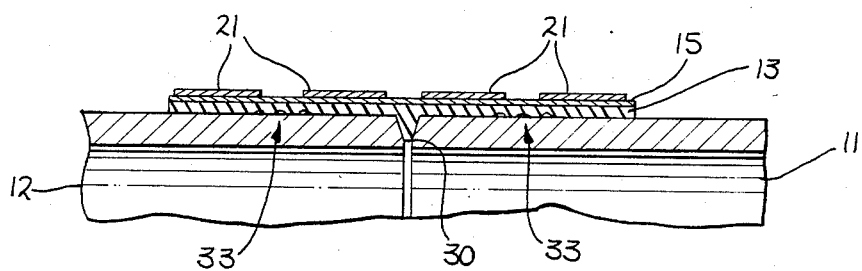
FIG. 2 is an enlarged, cross-sectional view taken along the line 2—2 in FIG. 1.

Referring now to the drawings and, more particularly, to FIG. 1 thereof, there is shown a preferred embodiment of the pipe coupling assembly, generally designated 10, of the present invention. The pipe coupling assembly 10 is applied to two opposing pipe segment ends 11 and 12, arranged in end-to-end relationship. As shown in FIG. 2, a cylindrical elastic gasket 13 is situated between the two pipe segment ends 11 and 12 so as to overlap and surround each pipe segment end. A metallic compression band 15 is disposed in overlapping relationship about the cylindrical elastic gasket 13.

The metallic compression band 15 is of substantially the same width as the cylindrical elastic gasket 13 and may be made of any ductal corrosion-resistant metal. As shown in FIG. 1, the metallic compression band 15 is provided with a series of corrugations 17 oriented coaxially with the pipe segments. The corrugations 17 permit modest flexibility between the adjoining pipe segments while retaining a certain amount of rigidity so as to resist transverse forces without buckling. Thus, the coupling and resulting plumbing system is capable of flexing through modest angles to accommodate some structural flexure as, for example, when a building settles.

The corrugations 17 in the metallic compression band 15 further facilitate the leak-proof coupling of two pipe segments of slightly different diameters. Due to the relatively inexact casting processes employed in the manufacturing of cast-iron pipe, variations in both the outer pipe diameter and eccentricity of a pipe segment will occur such that outer pipe diameters may vary in excess of one-sixteenth of an inch between pipe segments of a particular size. When the pipe coupling assembly 10 of the present invention is used to seal pipe segment ends 11 and 12 of slightly varying diameter, the corrugations 17 expand or contract as necessary to permit the application of roughly equivalent compressional forces to each pipe segment end.

When wrapped about the cylindrical elastic gasket 13, the metallic compression band 15 forms an underlying lapped edge and a lapping edge. The corrugations 17 of the metallic compression band 15 taper off to form a smooth planer surface along that portion of the metallic compression band 15 forming the underlying lapped edge. This arrangement of tapering corrugations terminating in a smooth planer portion along the lapped edge serves to preclude an interlocking of corrugations between the lapped edge and lapping edge of the metallic compression band. The obviation of interlocking corrugations prevents a build-up of tangential loading forces as the metallic compression band is compressed onto the pipe segments 11 and 12, thereby allowing a greater compression sealing force to be applied to tne cylindrical elastic gasket 13 and pipe segment ends 11 and 12.

Four tensioning bands 21 are affixed to and encircle the metallic compression band 15. The tensioning bands serve the dual function of securing the opposing pipe ends 11 and 12 within the pipe coupling 10 and compress the cylindrical elastic gasket 13 against the pipe ends 11 and 12 so as to form a pressure resistant seal.

The tensioning bands 21 of the present invention are of a kind typically found in industry and well known in the prior art. These tensioning bands 21 usually include a band 22 with a screw-type tensioning mechanism 23 affixed to one end or the band 22 and a plurality of inclined slots 26 punched through the band 22 along virtually its entire length. The screw-type tensioning mechanism 23 may include a screw element 24 designed to shear at a specific torque thereby preventing the application of excessive compressional forces to the encircled metallic compression band 15, cylindrical elastic gasket 13 and pipe segment ends 11 and 12. Further, where the pipe coupling 10 is installation in an open location, the screw element 24 may be provided with a "one-way" slotted head so shaped as to permit only tightening of the screw element 24.

The tensioning bands 21 are attached to the metallic compression band 15 by any convenient means, such as rivets 27. Preferrably rivets 27 extend above elongated slots 27a formed in each of the bands 21. This configuration enables the tension bands 21 to move to a limited extent over the compression band 15 as the tension bands 21 are tightened. As a result, better sealing can be achieved on maximum and minimum pipe connections. As discussed more fully below, the specific placement of the tensioning bands 21 along the length of the metallic compression band 15 is crucial to obtaining a pressure resistant seal. The tensioning bands 21 should be affixed to the metallic compression band 15 only at points approximately one-fourth to one-third of the circumferential distance along the band 22 from that end to which the screw-type tensioning mechanism 23 is attached. Securing the tensioning bands 21 at points further than one-third to one-fourth of this circumferential distance gives rise to tangential forces which stretch or flatten the corrugations 17 in the metallic compression band 15 during compression, thereby diminishing the rigidity of the pipe coupling assembly 10.

It should be understood that a greater number of tensioning bands may be used in larger embodiments of the pipe coupling assembly of the present invention without departing from the spirit of the invention as set forth in the claims below. Six tensioning bands, for example, are recommended to provide a leak-proof seal between pipe segments of 5 inches outer diameter or greater.

Figure 3:
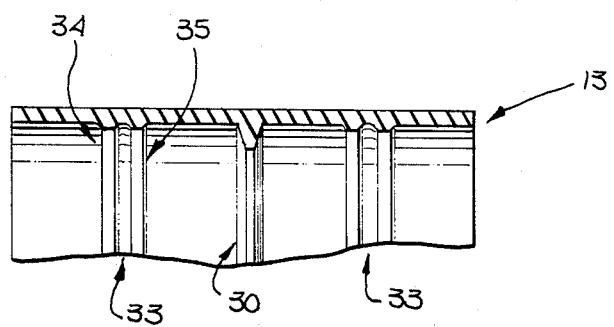
FIG. 3 is an enlarged, cross-sectional view of the elastic gasket used in the present invention.

As shown in FIG. 3, the cylindrical elastic gasket 13 includes as integral portions of its inside surface a centrally disposed separation ring 30 and two or more circular sealing berms 33. The sealing berms 33 are symmetrically disposed on opposing sides of the separation ring 30.

The cylindrical elastic gasket 13 may be composed of any suitable corrosion-resistant synthetic elastameric material. When the pipe coupling assembly 10 is placed in sealing relationship between two pipe segment ends 11 and 12, only the innermost portion of the separation ring 30 is exposed to the inside volume of the pipe segment. Thus, the introduction of a fluid or gas into the plumbing system having a corrosive effect on the gasket material will not readily contact or deteriorate the sealing surfaces within the cylindrical elastic gasket 13. The separation ring 30 also provides a resilient cushion between the abutting pipe segment ends 11 and 12 which serves to attenuate the propagation of vibration down the length of the plumbing system and accommodates expansion in the pipe segments caused, for example, by a rise in temperature of the pipe segments.

As can be seen in FIG. 3 each sealing berm 33 is made up of two annular sealing rings 34 and 35 disposed in close proximity to one another and formed integrally in and around the inside surface of the cylindrical elastic gasket 13. It should be understood that the size and number of sealing rings 34 and 35 forming the sealing berms 33 can be varied depending upon the surface characteristics of the pipe exterior or the internal pressure of the plumbing system. Each sealing berm 33 may, for example, be composed of one, two, three, or more sealing rings without departing from the spirit of the invention as set forth in the claims below. It should be further noted that the number of sealing berms is not restricted and may include any number necessary to effectuate an effective pressurized seal. On pipe segments having a five inch or larger diameter, for example, two sealing berms symmetrically disposed on opposing sides at the separation ring 30, making up a total of four sealing berms within a single cylindrical elastic gasket 10, would be advisable.

In operation the pipe segment ends 11 and 12 are inserted into the cylindrical elastic gasket 13, and brought into contact with opposing sides of the separation ring 30. The tensioning bands 21 are then tightened so as to compress the metallic compression band 15, thereby forcing the underlying cylindrical elastic gasket 13 against outer surface of the pipe segment ends 11 and 12.

As best seen in FIG. 2, the tensioning bands 21 are affixed to the metallic compression band 15 at points along opposing sides of each sealing berm 33. Each sealing berm 33 is therefore pressed against the outer surface of a pipe segment end by compressional forces which are applied directly to portions of the inner surface of the cylindrical elastic gasket 13 immediately adjacent each berm 33. This arrangement avoids a splaying or forcing apart of the separation rings 34 and 35 making up each sealing berm 33 as the tensioning bands are tightened down. By applying compressional loading forces to cylindrical elastic gasket surfaces on either side of the sealing berm 33 instead of directly over the sealing berm 33, a more effective seal is obtained which is capable of withstanding four to five times greater internal pressures than prior art elastic gasket-type pipe couplings. The prior art practice of placing tensioning bands 21 directly over each sealing berm 33 actually reduces the effective seal formed by the cylindrical elastic gasket 13 by forcing the sealing rings 34 and 35 apart.

From the foregoing, it is believed that the invention may be readily understood by those skilled in the art without further description. It should be duly noted that numerous changes may be made in the details disclosed without departing from the spirit of the invention as set forth in the claims below.

A smooth surfaced metallic compression band having logitudinal serrations and flanged edges may, for example, be used in place of the corrugated metallic compression discused above. Accordingly, it is to be understood that the invention is not to be limited by the specific emodiments, but only by the scope of the appended claims.

What is claimed is:

1. An improved elastic gasket-type pipe coupling for joining adjacent pipe segments, comprising:
    a cylindrical elastic gasket having a first annular sealing berm associated with a first pipe segment and a second annular sealing berm associated with a second pipe segment, each sealing beam comprising at least two closely arranged sealing rings, each said ring encircling the outer surface of the associated pipe segment;
    a metallic compression band circumferentially disposed about the cylindrical elastic gasket; and
    tensioning band encircling the metallic compression band, said tensioning bands disposed on the metallic compression band adjacent to and on both sides of each said sealing berm such that no portion of said tensioning bands is directly over said sealing berms, said tensioning bands upon tightening thereof applying loading force to either side of each said sealing berm and not directly over each said sealing berm thereby forcing each said sealing berm into a sealing relationship with the associated pipe segment.

2. an improved elastic gasket-type pipe coupling as recited in claim 1 wherein said tensioning bands are pivotally attached to said metallic compression band.

3. An improved elastic gasket-type pipe coupling as recited in claim 1 further including first and second pipe segments engaged by, respectively, said first sealing berm and said second berm.

4. An improved gasket-type pipe coupling as recited in claim 1 wherein said tension bands each include an elongated slot and further wherein joining means extend from said metallic compression band, through an associated slot and engage said tension bands thereby joining said tension bands to said metallic compression band.

* * * * *